US011862914B2

(12) United States Patent
Cheung

(10) Patent No.: US 11,862,914 B2
(45) Date of Patent: Jan. 2, 2024

(54) BULB ADAPTOR

(71) Applicant: NUHARVEST IT LIMTED, HongKong (CN)

(72) Inventor: Waihung Cheung, HongKong (CN)

(73) Assignee: NUHARVEST IT LIMTED, HongKong (CN)

( * ) Notice: Subject to any disclaimer, the term of this patent is extended or adjusted under 35 U.S.C. 154(b) by 72 days.

(21) Appl. No.: 17/741,363

(22) Filed: May 10, 2022

(65) Prior Publication Data

US 2023/0134209 A1 May 4, 2023

(30) Foreign Application Priority Data

Oct. 29, 2021 (CN) ........................ 202122636941.2

(51) Int. Cl.
*H01R 33/94* (2006.01)
*F21V 23/06* (2006.01)
*H01R 33/46* (2006.01)
*H01R 33/22* (2006.01)

(52) U.S. Cl.
CPC ............. *H01R 33/94* (2013.01); *F21V 23/06* (2013.01); *H01R 33/22* (2013.01); *H01R 33/46* (2013.01)

(58) Field of Classification Search
CPC ........ H01R 33/94; H01R 33/22; H01R 33/46; H01R 33/90; F21V 23/06
See application file for complete search history.

(56) References Cited

U.S. PATENT DOCUMENTS

| | | | | |
|---|---|---|---|---|
| 5,989,070 A * | 11/1999 | Al-Turki | F21V 19/006 | 439/644 |
| 8,328,582 B1 * | 12/2012 | Carley | F21V 23/06 | 439/642 |
| 2018/0145446 A1 * | 5/2018 | Archuleta | H01R 33/94 | |

FOREIGN PATENT DOCUMENTS

| | | | |
|---|---|---|---|
| GB | 2331405 A * | 5/1999 | H01R 33/90 |
| WO | WO-2012080743 A2 * | 6/2012 | F21V 19/0065 |

* cited by examiner

*Primary Examiner* — Oscar C Jimenez
*Assistant Examiner* — Paul D Baillargeon
(74) *Attorney, Agent, or Firm* — Georgi Korobanov

(57) ABSTRACT

A bulb adaptor is provided which includes a mounting housing, a rotating mechanism, a first connecting member and a second connecting member. The mounting is provided with threads. The first connecting member includes a convex first live contact part and two first metal connecting parts. The second connecting member includes a convex second live contact part, a neutral contact part and two second metal connecting parts. The second connecting member is arranged crosswise with the first connecting member. The rotating mechanism includes a rotating member and a convex part. The convex part has a first position and a second position. The first position is where the convex part is in electrical contact with the two first metal connecting parts, and the second position is where the convex part is in electrical contact with the two second metal connecting parts. The rotating member is slidably connected with the mounting housing.

10 Claims, 4 Drawing Sheets

10

BULB ADAPTOR

CROSS-REFERENCE TO RELATED APPLICATIONS

This is a U.S. patent application which claims the priority and benefit of Chinese Patent Application Number 202122636941.2, filed on Oct. 29, 2021, the disclosure of which is incorporated herein by reference in its entirety.

TECHNICAL FIELD

The disclosure relates to a field of lamp adaptors, in particular to a bulb adaptor.

BACKGROUND

For existing bulb adaptors, generally, threaded bulbs are connected with threaded adaptors and bayonet bulbs are connected with bayonet adaptors. However, when corresponding bulbs cannot be bought for the threaded adaptors or bayonet adaptors, the bulbs cannot be used with the adaptors, which is very inconvenient.

SUMMARY

An embodiment of the disclosure is to provide a bulb adaptor which can be matched and used with a threaded bulb or a bayonet bulb, which is convenient to use.

Embodiments of the disclosure can be realized as follows.

A bulb adaptor is provided in an embodiment of the disclosure, which includes a mounting housing, a rotating mechanism, a first connecting member and a second connecting member with cavities inside.

The mounting housing has a cylindrical structure and is provided with a first opening and a second opening oppositely disposed, and an inner wall of the mounting housing is provided with threads at the first opening.

The first connecting member includes a convex first live contact part and two first metal connecting parts. One of the first metal connecting parts is electrically connected with the threads, and the other of the first metal connecting parts is electrically connected with the first live contact part.

The second connecting member includes a convex second live contact part, a neutral contact part and two second metal connecting parts. The two second metal connecting parts are electrically connected with the second live contact part and the neutral contact part respectively. The second connecting member is arranged crosswise with the first connecting member, so that the first live contact part is staggered with both the second live contact part and the neutral contact part.

The rotating mechanism includes a rotating member and a convex part fixed to the rotating member. The convex part has a first position and a second position. The first position is where the convex part is in electrical contact with the two first metal connecting parts, and the second position is where the convex part is in electrical contact with the two second metal connecting parts. The rotating member is slidably connected with the mounting housing, so that the rotating member can rotate along a circumferential direction of the mounting housing, and the convex part moves between the first position and the second position.

Further, the first connecting member includes a first supporting part connected with both ends of the first live contact part, and a bottom end of the first supporting part is provided with the first metal connecting part. The second connecting member includes two second supporting parts connected with the second live contact part and the neutral contact part, and a bottom end of each of the second supporting part is provided with a second metal connecting part. The first supporting part is connected with the mounting housing through a first telescopic connecting member, and the second supporting part is connected with the mounting housing through a second telescopic connecting member.

Further, the inner wall of the mounting housing is provided with two first mounting cavities oppositely disposed and two second mounting cavities oppositely disposed, the first mounting cavities and the second mounting cavities are arranged at intervals, two first supporting parts are respectively provided in the two first mounting cavities, and two second supporting parts are respectively provided in the two second mounting cavities.

Further, the convex part is arranged at the second opening and extends along a radial direction of the mounting housing, two ends of the convex part along an extending direction are provided with a live contact point and a neutral contact point, a side wall of the convex part away from the second opening is connected with a live contact and a neutral contact, the live contact is electrically connected with the live contact point, and the neutral contact is electrically connected with the neutral contact point. The first position is where the live contact point and the neutral contact point of the convex part are electrically contacted with the two first metal connecting parts respectively, and the second position is where the live contact point and the neutral contact point of the convex part are electrically contacted with the two second metal connecting parts respectively.

Further, a cross section of the convex part along a thickness direction is trapezoidal.

Further, a plastic isolation plate is provided within an inner space of the mounting housing, the plastic isolation plate is defined with a plurality of through holes, and the plurality of through holes are respectively arranged corresponding to the first live contact part, the second live contact part and the neutral contact part.

Further, an inner wall of the rotating member is provided with a sliding part, and an outer wall of the mounting housing is provided with a limiting part with a sliding groove, the sliding groove extends along the circumferential direction of the mounting housing, and the sliding part is slidably matched with the sliding groove.

Further, the sliding part is a triangular protrusion.

Further, the sliding groove is provided with an engaging port, the sliding part is provided with an engaging joint which can be snapped with the engaging port, and the engaging port is arranged correspondingly to the first supporting parts and the second supporting parts.

Further, ends of the first metal connecting part and the second metal connecting part are both arc-shaped.

The bulb adaptor of the embodiment of the disclosure provides advantages that:

When the convex part is at the first position, the convex part is in electrical contact with the two first metal connecting parts, and at this time, the threaded bulb is screwed in from the first opening to form a threaded connection with the threads of the inner wall of the mounting housing, the threads of the mounting housing is electrically connected with one of the first metal connecting parts, and the other of the first metal connecting parts is electrically connected with the first live contact part, and the threads of the mounting housing serves as a neutral connecting part. When the threaded bulb is screwed in, a live wire of the threaded bulb is connected with the convex first live contact part and a neutral wire of the threaded bulb is connected with the threads of the mounting housing, so that the threaded bulb can be lit.

When a bayonet bulb is installed to be matched with a bulb adaptor, the rotating member moves along the circumferential direction of the mounting housing, the live contact point and the neutral contact point of the convex part are separated from the two first metal connecting parts, and a position of the first connecting member lowers along a height direction of the mounting housing. When the rotating member is rotated to the second position of the convex part, the convex part is electrically contacted with the two second metal connecting parts, and a position of the second connecting member rises along the height direction of the mounting housing. In this process, because the second connecting member is arranged crosswise with the first connecting member, the first live contact part is staggered with the second live contact part and the neutral contact part, so that the first live contact part does not interfere with the second live contact part and the neutral contact part. When the convex part is at the second position, the bayonet bulb is matched with a clamping groove of the mounting housing to fix the bulb, the live wire and the neural wire of the bayonet bulb are respectively connected with the convex second live contact part and the neutral contact part, so that the threaded bulb can be lit.

The bulb adaptor of the embodiment of the disclosure can be matched and used with the threaded bulb or the bayonet bulb respectively only by rotating the rotating part, which is convenient to use.

BRIEF DESCRIPTION OF DRAWINGS

In order to illustrate technical schemes of embodiments of this disclosure more clearly, the following drawings used in the embodiments will be briefly introduced; it should be understood that the following drawings only show some embodiments of this application, therefore they should not be regarded as a limiting of the protection scope; and other related drawings can be obtained according to these ones without creative effort for ordinary skilled in the art.

Figure 1:
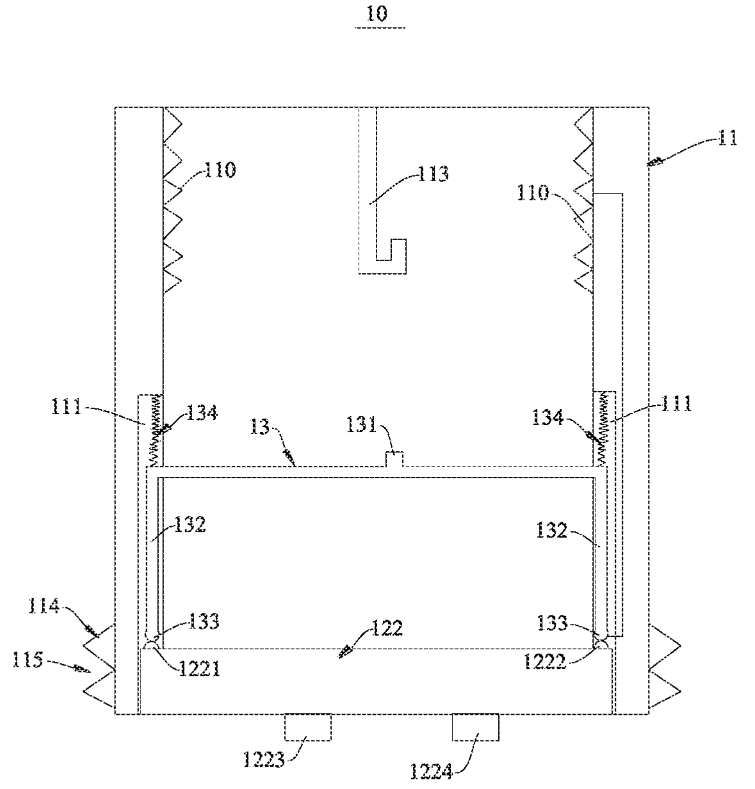
FIG. 1 is a partial structural schematic diagram of the bulb adaptor when a convex part is at a first position according to an embodiment of this disclosure.

Reference Number: 10—Bulb Adaptor; 11—Mounting housing; 110—Thread; 111—First Mounting Cavity; 112—Second Mounting Cavity; 113—Clamping Groove; 114—Limiting Part; 115—Sliding Groove; 12—Rotating Mechanism; 121—Rotating Member; 1211—Sliding Part; 122—Convex Part; 1221—Live Contact Point; 1222—Neutral Contact Point; 1223—Live Contact; 1224—Neutral Contact; 13—First Connecting Member; 131—First Live Contact Part; 132—First Supporting Part; 133—First Metal Connecting Part; 134—First Telescopic Connecting Member; 14—Second Connecting Member; 141—Second Live Contact Part; 142—Neutral Contact Part; 143—Second Supporting Part; 144—Second Metal Connecting Part; 145—Second Telescopic Connecting Member; 15—Plastic Isolation Plate.

DETAILED DESCRIPTION

In order to make the purposes, technical schemes and advantages of embodiments of this disclosure more clear, the technical schemes in the embodiments of this disclosure will be described clearly and completely with reference to the drawings in the embodiments of this disclosure; and it is Obvious that the described embodiments are part of the embodiments of this disclosure, but not all of them. The components of the embodiments of the application generally described and illustrated in the drawings herein can be arranged and designed in various different configurations.

Therefore, the following detailed description of the embodiments of the application provided in the drawings is not intended to limit the claimed scope of the application, but only shows selected embodiments of the application. On a basis of the embodiments in this application, all other embodiments obtained by the ordinary skilled in the art without any creative effort are within the protection scope of this application.

In the description of this application, it should be noted that the orientation or position relationships indicated by the terms such as “top”, “bottom”, “inner” and “outer” are based on the orientation or position relationships shown in the drawings, or the generally adopted orientation or position relationships when the products of this application are used are only for convenience of describing this application and for simplifying the description, but do not indicate or imply that the referred device or element must have a specific orientation, be constructed and operated in a specific orientation, and therefore cannot be understood as a limitation of this disclosure. In addition, the terms “first”, “second”, etc. are only used to distinguish descriptions, and cannot be understood as indicating or implying a relative importance.

In the description of this application, it should also be noted that unless otherwise specified and limited, the terms “providing”, “installing” and “connecting” should be understood in a broad sense, for example, it can be “fixedly connecting”, or “detachably connecting” or “integrally connecting”, or it can be “mechanically connecting” or “electrically connecting”, or it can be “directly connecting” or “indirectly connecting through an intermediate medium”, or it can be “communicating within two elements”. For those ordinary skilled in the art, the specific meanings of the above terms in this application can be understood according to specific situations.

A bulb adaptor 10 is provided in an embodiment of the disclosure, which includes a mounting housing 11, a rotating mechanism 12, a first connecting member 13 and a second connecting member 14 with cavities inside.

Figure 2:
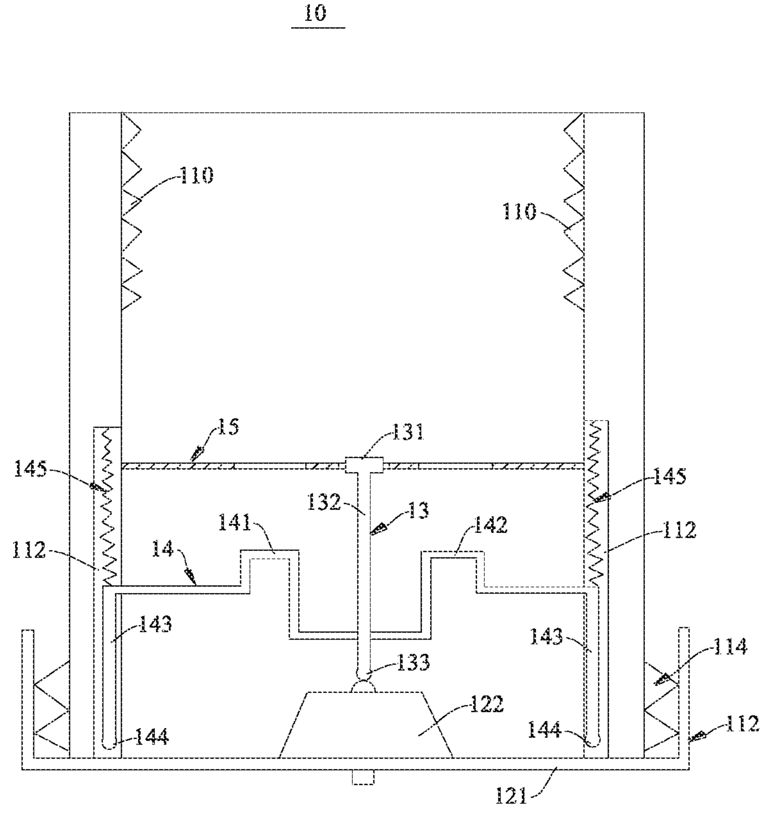
FIG. 2 is a structural schematic diagram of the bulb adaptor when a convex part is at the first position according to an embodiment of this disclosure from another perspective.

Referring to FIGS. 1 and 2, the mounting housing 11 is a cylindrical structure and is provided with a first opening and a second opening oppositely disposed. As shown in FIG. 1, the first opening is located at top and the second opening is located at bottom. An inner wall of the mounting housing 11 is provided with threads 110 at the first opening, and the inner wall of the mounting housing 11 is provided with two first mounting cavities 111 oppositely disposed and two second mounting cavities 112 oppositely disposed, the first mounting cavities 111 and the second mounting cavities 112 are arranged at intervals, and the mounting housing 11 is further provided with a clamping groove 113 for matching with a clamping joint of the bayonet bulb. The threads 110 are mainly used for matching with the threaded 110 bulb, and the clamping groove 113 is mainly used for matching with the bayonet bulb, so that two kinds of bulbs can be fixed.

Figure 3:
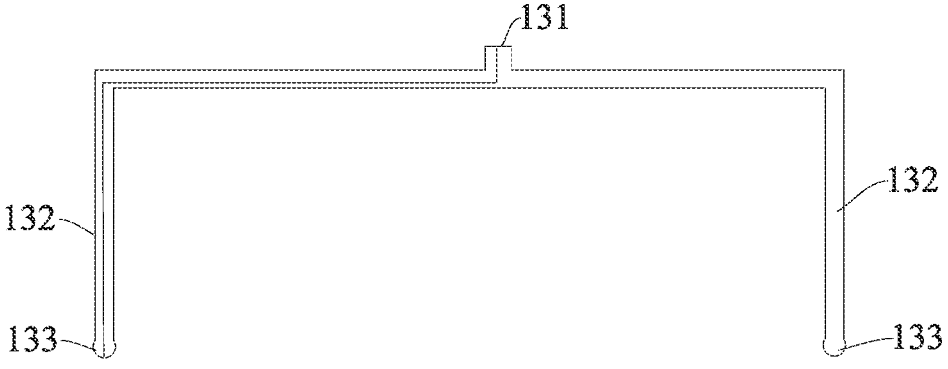
FIG. 3 is a structural diagram of a first connecting member according to an embodiment of this disclosure.

Referring to FIGS. 1 to 3, the first connecting member 13 includes a convex first live contact part 131 and two first metal connecting parts 133. One of the first metal connecting parts 133 is electrically connected with the threads 110 through a wire, and the other of the first metal connecting parts 133 is electrically connected with the first live contact part 131 through a wire.

Optionally, the first connecting member 13 includes a first supporting part 132 connected to both ends of the first live contact part 131, a bottom of the first supporting part 132 is provided with the first metal connecting part 133, two first supporting parts 132 are respectively provided in the two first mounting cavities 111, and the first supporting part 132 is connected with the mounting housing 11 through a first telescopic connecting member 134. It should be noted that the first connecting member 13 is made of insulating material except the first live contact part 131 and the first metal connecting part 133.

For example, the first telescopic connecting member 134 is a spring, and the spring can be compressed when a bottom end of the first supporting part 132 is subjected to a force to make the first supporting part 132 move upward. When the force at the bottom end of the first supporting part 132 is removed, the spring changes from a compressed state to a normal state, so that the first supporting part 132 moves downward. In other embodiments, the first telescopic connecting member 134 may also be an elastic piece.

Figure 4:
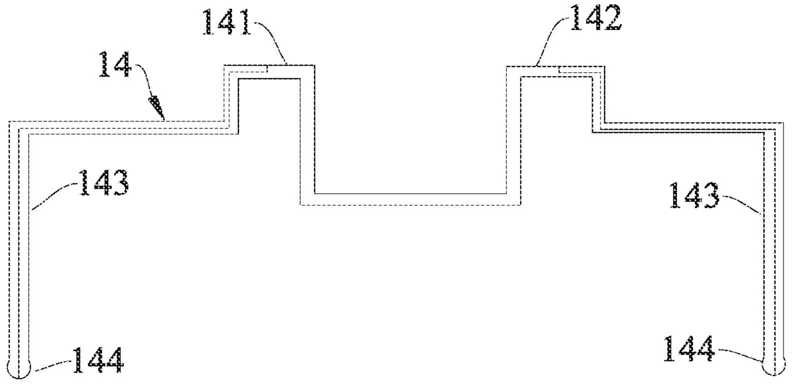
FIG. 4 is a structural diagram of a second connecting member according to an embodiment of this disclosure.

Referring to FIGS. 1, 2 and 4, the second connecting member 14 includes a convex second live contact part 141, a neutral contact part 142 and two second metal connecting parts 144, and the two second metal connecting parts 144 are electrically connected with the second live contact part 141 and the neutral contact part 142 by a wire respectively. The second connecting member 14 is arranged crosswise with the first connecting member 13, so that the first live contact part 131 is staggered with both the second live contact part 141 and the neutral contact part 142.

Optionally, the second connecting member 14 includes two second supporting parts 143 respectively connected with the second live contact part 141 and the neutral contact part 142, and a bottom end of the second supporting part 143 is provided with a second metal connecting part 144. The two second supporting parts 143 are respectively arranged in the two second mounting cavities 112, and the second supporting parts 143 are connected with the mounting housing 11 through the second telescopic connecting member 145. The second connecting member 14 is arranged crosswise with the first connecting member 13, so that the first live contact part 131 is staggered with both the second live contact part 141 and the neutral contact part 142, it should be noted that the second connecting member 14 is made of insulating material except the second live contact part 141, the neutral contact part 142 and the second metal connecting part 144.

For example, the second telescopic connecting member 145 is a spring, and the spring can be compressed when a bottom end of the second supporting part 143 is subjected to a force to make the second supporting part 143 move upward. When the force at the bottom end of the second supporting part 143 is removed, the spring changes from a compressed state to a normal state, so that the second supporting part 143 moves downward. In other embodiments, the second telescopic connecting member 145 may also be an elastic piece.

Figure 5:
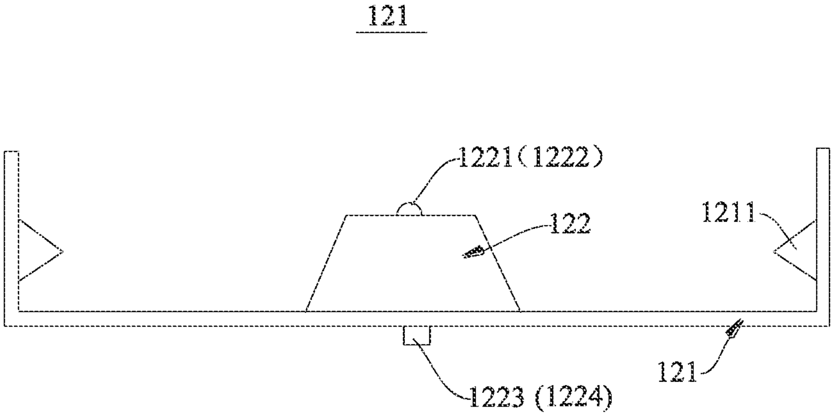
FIG. 5 is a structural schematic diagram of a rotating mechanism according to an embodiment of this disclosure.

Referring to FIGS. 2 and 5, the rotating mechanism 12 includes a rotating member 121 and a convex part 122 fixed to the rotating member 121, The convex part 122 has a first position and a second position. The first position is where the convex part 122 is in electrical contact with the two first metal connecting parts 133 (see FIGS. 1 and 2), and the second position is where the convex part 122 is in electrical contact with the two second metal connecting parts 144 (see FIG. 6). The rotating member 121 is slidably connected with the mounting housing 11, so that the rotating member 121 can rotate along a circumferential direction of the mounting housing 11, and the convex part 122 moves between the first position and the second position.

In some embodiments, the convex part 122 is arranged at the second opening and extends along a radial direction of the mounting housing 11, two ends of the convex part 122 along an extending direction are provided with a live contact point 1221 and a neutral contact point 1222, a side wall of the convex part 122 away from the second opening is connected with a live contact 1223 and a neutral contact 1224, the live contact 1223 is electrically connected with the live contact point 1221, and the neutral contact 1224 is electrically connected with the neutral contact point. The live contact 1223 and the neutral contact 1224 of the protrusion 122 are used to connect with a live wire and a neutral wire in an arranged circuit.

Figure 6:
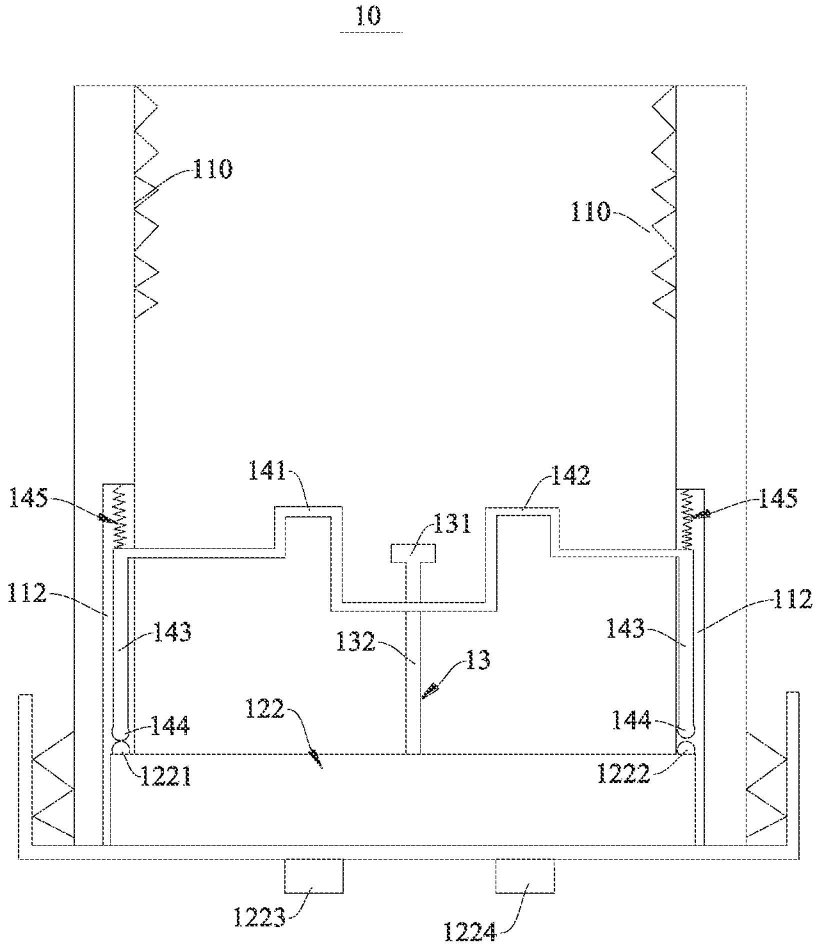
FIG. 6 is a structural schematic diagram of the bulb adaptor when a convex part is at a second position according to an embodiment of this disclosure.

The first position is where the live contact point 1221 and the neutral contact point 1222 of the convex part 122 are electrically contacted with the two first metal connecting parts 133 respectively (see FIGS. 1 and 2), and the second position is where the live contact point 1221 and the neutral contact point 1222 of the convex part 122 are electrically contacted with the two second metal connecting parts 144 respectively (see FIG. 6).

When the convex part 122 is located at the first position, the convex part 122 supports the two first supporting parts 132, and makes the live contact point 1221 and the neutral contact point 1222 of the convex part 122 electrically contact with the two first metal connecting parts 133 respectively. At this time, the threaded 110 bulb is screwed in from the first opening to form a threaded 110 connection with the threads 110 of the inner wall of the mounting housing 11, the threads 110 of the mounting housing 11 is electrically connected with one of the first metal connecting parts 133, and the other of the first metal connecting parts 133 is electrically connected with the first live contact part 131, and the threads 110 of the mounting housing 11 serves as a neutral connecting part. When the threaded 110 bulb is screwed in, a live wire of the threaded 110 bulb is connected with the convex first live contact part 131 and a neutral wire of the threaded 110 bulb is connected with the threads 110 of the mounting housing 11, so that the threaded 110 bulb can be lit.

When the bayonet bulb is to be matched and installed, the rotating member 121 moves along the circumferential direction of the mounting housing 11, the convex part 122 moves out of supporting the two first supporting parts 132, the live contact point 1221 and the neutral contact point 1222 of the convex part 122 are disconnected with the two first metal connecting parts 133, and a position of the first connecting member 13 lowers along a height direction of the mounting housing 11. When the rotating member 121 is rotated to the second position of the convex part 122, the convex part 122 supports the two second supporting parts 143, and makes the live contact point 1221 and the neutral contact point 1222 of the convex part 122 electrically contact with the two second metal connecting parts 144, respectively. A position of the second connecting member 14 rises along the height direction of the mounting housing 11. In this process, because the second connecting member 14 is arranged crosswise with the first connecting member 13, the first live contact part 131 is staggered with both the second live contact part 141 and the neutral contact part 142, so that the first live contact part 131 does not interfere with the second live contact part 141 and the neutral contact part 142 in a lowering or rising process. In the first position, the first live contact part 131 is located above the second live contact part 141 and the neutral contact part 142, and in the second position, the second live contact part 141 and the neutral contact part 142 are located above the first live contact part 131. Optionally, the second connecting member 14 and the first connecting member 13 are arranged in a cross.

When the convex part 122 is at the second position, the bayonet bulb is matched with a clamping groove 113 of the mounting housing 11 to fix the bulb, the live wire and the neural wire of the bayonet bulb are respectively connected with the convex second live contact part 141 and the neutral contact part 142, so that the threaded 110 bulb can be lit.

The bulb adaptor 10 of the embodiment of the disclosure can be matched and used with the threaded 110 bulb or the bayonet bulb respectively only by rotating the rotating part, which is convenient to use.

Referring to FIG. 2, in a feasible embodiment, a plastic isolation plate 15 is provided within an inner space of the mounting housing 11, the plastic isolation plate 15 is defined with a plurality of through holes, and the plurality of through holes are respectively arranged corresponding to the first live contact part 131, the second live contact part 141 and the neutral contact part 142.

When the bulb is matched with the bulb adaptor 10, whether it is a threaded 110 bulb or a bayonet bulb, the live wire or the neural wire of the bulb can only contact with the first live contact part 131, the second live contact part 141 and the neutral contact part 142 through the through holes due to action of the plastic isolation plate 15, with a more accurate connection.

Figure 7:
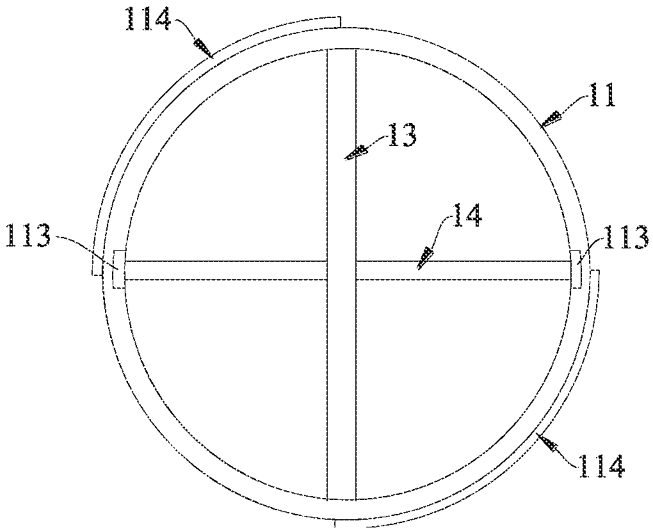
FIG. 7 is a schematic diagram of relative positions of a first connecting member and a second connecting member according to an embodiment of the present application.

Referring to FIGS. 1, 5 and 7, for example, an inner wall of the rotating member 121 is provided with a sliding part 1211, and an outer wall of the mounting housing 11 is provided with a limiting part 114 with a sliding groove 115, the sliding groove 115 extends along the circumferential direction of the mounting housing 11, and the sliding part 1211 is slidably matched with the sliding groove 115.

The sliding part 1211 can move along the circumferential direction of the mounting housing 11 through sliding fit between the sliding part 1211 and the sliding groove 115. The sliding groove 115 limits a moving path of the sliding part 1211, so that the sliding part 1211 moves along the circumferential direction of the mounting housing 11 more smoothly, Optionally, the sliding part 1211 is a triangular protrusion. Two sides of the triangle can cooperate with the sliding groove 115 and both sides are limited, so that the sliding part 1211 can move along the circumferential direction of the mounting housing 11 more smoothly:

Optionally, the sliding groove 115 is provided with an engaging port (not shown in the figure), the sliding part 1211 is provided with an engaging joint which can be snapped with the engaging port (not shown in the figure), and the engaging port is arranged correspondingly to the first supporting parts 132 and the second supporting parts 143. When the rotating part is rotated so that the convex part 122 is located at the first position, the engaging joint of the sliding part 1211 matches with the engaging port of the corresponding first supporting part 132 of the sliding groove 115, and the sliding part 1211 stops moving. At this time, the sliding part 1211 can only move in a opposite direction. When the rotating part is rotated in the opposite direction so that the convex part 122 is located at the second position, the engaging joint of the sliding part 1211 engages with the engaging port of the corresponding second supporting part 143 of the sliding groove 115, and the sliding part 1211 stops moving. With the sliding slot 115 being provided with the engaging port, the sliding part 1211 is provided with the engaging joint which can be snapped with the engaging port, and the engaging port is arranged correspondingly to the first supporting parts 132 and the second supporting parts 143, so that the convex part 122 can be fixed at the first position and the second position respectively, with a more accurate positioning.

Figure 8:
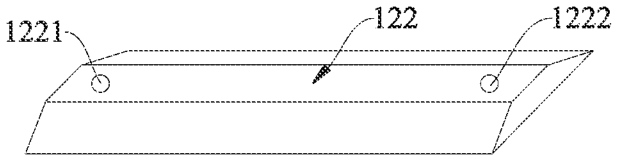
FIG. 8 is a structural diagram of a convex part according to an embodiment of this disclosure.

In a feasible embodiment, a cross section of the convex part 122 along a thickness direction is trapezoidal (see FIG. 8). The convex part 122 extends in a radial direction of the mounting housing 11, and its cross section along the thickness direction is trapezoidal, so that when the convex part 122 is at the first position, its top can jack up the first supporting part 132, and when the rotating part is rotated to move the convex part 122 from the first position to the second position, an inclined surface of the trapezoid can easily jack up the second supporting part 143.

Illustratively, ends of the first metal connecting part 133 and the second metal connecting part 144 are both arc-shaped. In this way; resistance for the convex part 122 when moving between the first position and the second position is small, which facilitates movement of the convex part 122.

Further, in a feasible embodiment, the live wire contact 1223 and the live wire contact 1221 are electrically connected through a wire, and an infrared remote control switch is provided on the wire. Since the bulb adaptor 10 is provided with the infrared remote control switch, the infrared remote control switch can be remotely controlled by a remote controller to control switching and brightness of the bulb, which is convenient for operation.

In another feasible embodiment, a control switch can be provided on the wire, which has a Bluetooth module. With a wireless connection between Bluetooth on a mobile phone and the Bluetooth module of the bulb adaptor 10, the bulb can be controlled by the mobile phone, which is convenient for operation.

To sum up, the bulb adaptor 10 of the embodiment of the present disclosure can be matched and used with the threaded bulb 110 or the bayonet bulb respectively only by rotating the rotating part to make the convex part 122 move between the first position and the second position, which is convenient to use.

The above is only preferred embodiments of this application, and is not intended to limit this application, and modifications and variations can be made in this application for those skilled in the art. Any modification, equivalent substitution, improvement, etc. made within the spirit and principle of this disclosure shall be encompassed within the protection scope of this disclosure.

What is claimed is:

1. A bulb adaptor, comprising a mounting housing, a rotating mechanism, a first connecting member and a second connecting member with cavities inside, wherein the mounting housing has a cylindrical structure and is provided with a first opening and a second opening oppositely disposed, and an inner wall of the mounting housing is provided with threads at the first opening;

the first connecting member comprises a convex first live contact part and two first metal connecting parts, one of the first metal connecting parts being electrically connected with the threads, and the other of the first metal connecting parts being electrically connected with the first live contact part;

the second connecting member comprises a convex second live contact part, a neutral contact part and two second metal connecting parts, the two second metal connecting parts being electrically connected with the second live contact part and the neutral contact part respectively, and the second connecting member being arranged crosswise with the first connecting member, so that the first live contact part is staggered with both the second live contact part and the neutral contact part; and the rotating mechanism comprises a rotating member and a convex part fixed to the rotating member, the convex part having a first position and a second position, the first position being where the convex part is in electrical contact with the two first metal connecting parts, and the second position being where the convex part is in electrical contact with the two second metal connecting parts; the rotating member being slidably connected with the mounting housing, so that the rotating member can rotate along a circumferential direction of the mounting housing, and the convex part moves between the first position and the second position.

2. The bulb adaptor according to claim 1, wherein the first connecting member comprising a first supporting part connected with both ends of the first live contact part, a bottom end of the first supporting part being provided with the first metal connecting part; the second connecting member comprises two second supporting parts connected with the second live contact part and the neutral contact part, a bottom end of each of the second supporting part being provided with a second metal connecting part; the first supporting part being connected with the mounting housing through a first telescopic connecting member, and the second supporting part being connected with the mounting housing through a second telescopic connecting member.

3. The bulb adaptor according to claim 2, wherein the inner wall of the mounting housing is provided with two first mounting cavities oppositely disposed and two second mounting cavities oppositely disposed, the first mounting cavities and the second mounting cavities being arranged at intervals, two first supporting parts being respectively provided in the two first mounting cavities, and two second supporting parts being respectively provided in the two second mounting cavities.

4. The bulb adaptor according to claim 2, wherein an inner wall of the rotating member is provided with a sliding part, and an outer wall of the mounting housing is provided with a limiting part with a sliding groove, the sliding groove extending along the circumferential direction of the mounting housing and the sliding part being slidably matched with the sliding groove.

5. The bulb adaptor according to claim 4, wherein the sliding part is a triangular protrusion.

6. The bulb adaptor according to claim 4, wherein the sliding groove is provided with an engaging port, the sliding part is provided with an engaging joint which can be snapped with the engaging port, the engaging port being arranged correspondingly to the first supporting parts and the second supporting parts.

7. The bulb adaptor according to claim 1, wherein the convex part is arranged at the second opening and extends along a radial direction of the mounting housing, two ends of the convex part along an extending direction are provided with a live contact point and a neutral contact point, a side wall of the convex part away from the second opening is connected with a live contact and a neutral contact, the live contact being electrically connected with the live contact point and the neutral contact being electrically connected with the neutral contact point; the first position is where the live contact point and the neutral contact point of the convex part are electrically contacted with the two first metal connecting parts respectively, and the second position is where the live contact point and the neutral contact point of the convex part are electrically contacted with the two second metal connecting parts respectively.

8. The bulb adaptor according to claim 7, wherein a cross section of the convex part along a thickness direction is trapezoidal.

9. The bulb adaptor according to claim 1, wherein a plastic isolation plate is provided within an inner space of the mounting housing, the plastic isolation plate being defined with a plurality of through holes and the plurality of through holes being respectively arranged corresponding to the first live contact part, the second live contact part and the neutral contact part.

10. The bulb adaptor according to claim 1, wherein ends of the first metal connecting part and the second metal connecting part are both arc-shaped.

* * * * *